United States Patent
Opaterny

(10) Patent No.: US 7,117,395 B2
(45) Date of Patent: Oct. 3, 2006

(54) TESTING METHOD AND TESTING DEVICE FOR STARTING UP SYSTEMS WHICH ARE CONTROLLED BY MEANS OF A PROGRAM LOGIC

(75) Inventor: Thilo Opaterny, Nuernberg (DE)

(73) Assignee: Siemens Aktiengesellschaft, Munich (DE)

( * ) Notice: Subject to any disclaimer, the term of this patent is extended or adjusted under 35 U.S.C. 154(b) by 497 days.

(21) Appl. No.: 10/428,837

(22) Filed: May 5, 2003

(65) Prior Publication Data

US 2004/0073850 A1 Apr. 15, 2004

Related U.S. Application Data

(63) Continuation of application No. PCT/DE01/04067, filed on Oct. 26, 2001.

(30) Foreign Application Priority Data

Nov. 3, 2000 (DE) ............... 100 54 542

(51) Int. Cl.
*G06F 11/00* (2006.01)
(52) U.S. Cl. ........................ 714/39; 717/127
(58) Field of Classification Search .......... 714/725, 714/39; 717/131, 132, 133, 127
See application file for complete search history.

(56) References Cited

U.S. PATENT DOCUMENTS

| | | | | |
|---|---|---|---|---|
| 5,267,145 A | * | 11/1993 | Zifferer et al. ........... | 700/86 |
| 5,276,811 A | * | 1/1994 | Zifferer et al. ........... | 703/25 |
| 5,812,133 A | * | 9/1998 | Schultz et al. ........... | 715/809 |
| 6,106,572 A | | 8/2000 | Halpern | |
| 6,158,024 A | * | 12/2000 | Mandal ...................... | 714/37 |
| 6,557,167 B1 | * | 4/2003 | Thelen ....................... | 717/127 |

FOREIGN PATENT DOCUMENTS

| | | |
|---|---|---|
| EP | 0 483 368 A | 5/1992 |
| JP | 10149212 | 6/1998 |

\* cited by examiner

*Primary Examiner*—Scott Baderman
*Assistant Examiner*—Paul Contino
(74) *Attorney, Agent, or Firm*—Sughrue Mion, PLLC

(57) ABSTRACT

When systems controlled using a program logic, such as automation systems, are started up, it is necessary to observe individual program areas specifically. Program areas of this type are usually described by one or more modules of a program. This presents the problem that, in order to obtain an accurate analysis, the requests for these modules have to be identified in connection with the modules themselves, since they are ordinarily used multiple times. The present testing method and testing device are used to calculate and display a hierarchical request tree that shows the requests corresponding to a selected module. One or more requests for the selected module can be selected for observation by selecting individual lines of this request tree.

15 Claims, 1 Drawing Sheet

```
1:      FB10
2:              FB5, NW10,4
3:                      FB3, NW4,6
4:                              OB1, NW1,2
5:                              OB1, NW5,2
6:                      FB3, NW6,6
7:                              OB1, NW1,2
8:                              OB1, NW5,2
9:              OB1, NW4,7
```

```
1:      FB10
2:              FB5, NW10,4
3:                              FB3, NW4,6
4:                                              OB1, NW1,2
5:                                              OB1, NW5,2
6:                              FB3, NW6,6
7:                                              OB1, NW1,2
8:                                              OB1, NW5,2
9:              OB1, NW4,7
```

TESTING METHOD AND TESTING DEVICE FOR STARTING UP SYSTEMS WHICH ARE CONTROLLED BY MEANS OF A PROGRAM LOGIC

This is a Continuation of International Application PCT/DE01/04067, with an international filing date of Oct. 26, 2001, which was published under PCT Article 21(2) in German, and the disclosure of which is incorporated into this application by reference.

FIELD OF AND BACKGROUND OF THE INVENTION

The invention relates to a testing method and a testing device for commencing operation of a system, preferably an automation system, which is controlled by means of a program logic. References describing the state of the art in this general field include U.S. Pat. No. 6,106,572, EP 0 483 368 A1, and JP 101 49 212, all of which are incorporated herein by reference.

As a rule, automation systems are permanently running, open loop and/or closed-loop-controlled cybernetic systems. To control these processes, program logics are used, which are typically composed of program modules that can be requested repeatedly and as needed. The required programming technology is referred to as loop coding.

To create a solution for an open loop or closed loop task, the programmer must dissect the corresponding task as much as possible, divide it into partial tasks and program reusable modules to solve these partial tasks. In the case of graphic programming languages, e.g., ladder diagram or sequential function chart, the respective user programs are said to be composed of modules. These modules consist of networks. The networks represent operations that combine the operands used within the program logic. The networks are ultimately logic operations of the operands used.

Each module of an interface used within the described network can be called by other modules. In the program, the respective modules are called by a corresponding request. After the corresponding module has been executed, the program jumps back to a return address that identifies the location of the statement following the module request. Typically, the return addresses required for this purpose are stored on a so-called stack. With each request of a further module, an additional return address must be deposited on this stack. In other words, the stack grows with each module request. After the program returns to the indicated return address, the information of the return address no longer needs to be stored. The stack shrinks by this information. The return address consists of a module identifier, i.e., the identification of the requesting module, and the value of the address counter that identifies the location of the program statement that is to be executed after the requested module has been executed. The return address, or the information deposited on the stack for each module request, thus uniquely identifies the corresponding module request.

In connection with the startup of automation systems, it is often necessary to observe the program logic used for the open loop or closed loop control of the automation system in specific situations, i.e., under specific parameters. Observing the program under specific defined conditions often requires observing a specific module.

OBJECTS OF THE INVENTION

Thus, an object of the invention is to provide a testing method and a testing device for program logics, particularly for use in automation systems, making it possible to select a specific execution of a selected module in order to observe the module.

SUMMARY OF THE INVENTION

The definition of a specific module request by the startup engineer is a substantial problem. Due to recursions that are typically created in programs, i.e., due to the fact that within the requested modules other modules, possibly even the requested module itself, are requested, the requests are relatively complex. Consequently, to select a specific request, all possible modules and all possible request paths must first be checked to ensure that the desired request of the selected module is determined. The return address that might define a specific request is not typically available.

In the method according to the invention, the module identifiers presently of interest, and the locations where they are used, are first selected from a cross-reference list, which is generated in the various translation runs of the program logic and which contains all the identifiers used in the program logic and the locations of their use. This list of the module identifiers can then be used to select the module identifier of interest in connection with the program part that is to be checked. With respect to this selected module, an overview of the requests, or of a portion of the requests, is generated and displayed. Since the execution of a module is uniquely identified by its request, the specific request, and consequently a specific execution of the module, can then be uniquely selected from the aforementioned overview. This execution of the module, in particular, is output for observation.

The testing method according to the invention is thus a tool for the programmer or the engineer starting up the automation system to select a specific module request and monitor the execution of this module request for test purposes.

Such a testing method is useful especially in connection with the above-described graphic programming languages. The capability as well as the complexity of these languages requires special testing methods.

The starting point of the testing method is to generate a cross-reference list that includes all the locations where the identifiers are used, i.e., including the module identifier of interest. For each request, this cross-reference list thus includes the corresponding module identifier and its return address. The return address uniquely defines each request of a module. To that extent it is possible to use the information obtained in the translation runs of the program logic to calculate an overview of the requests of a selected module. The cross-reference list can be obtained without additional processor capacity because it is generated as a matter of course when the program logic is translated. Within the scope of the solution according to the invention, this cross-reference list is temporarily stored and subsequently available for further use and analysis.

In one advantageous embodiment, the overview of the requests of a selected module is structured as a hierarchical request tree. From this overview, the startup engineer or programmer can see the hierarchy, and especially the recursions, at a glance.

To avoid generating an endless loop, the calculation of a request path is aborted if a return address is listed multiple times.

The drawback that such recursive requests cannot be displayed and selected in freely selectable depths is offset by the avoidance of system crashes and the improvement in the clarity of the display.

With the aid of this display it is then possible to uniquely define one or more requests of the selected module simply by marking one or more lines in the display.

The programmer or startup engineer can then monitor such selected requests in a corresponding observation process.

The testing device proposed to attain the object of the invention advantageously provides a display device for the hierarchical display of the requests of a selected module.

In addition, this testing device is advantageously provided with a marking tool by means of which specific requests can be marked and selected from among the requests of a module in the aforementioned display.

The executions of a module, which are uniquely defined by the selection of one or more requests, can then be observed for test purposes by means of a corresponding observation tool.

BRIEF DESCRIPTION OF THE DRAWINGS

The invention will now be explained in greater detail with reference to an exemplary embodiment. For this purpose, the drawing shows one possible display of the requests of a module. The FIGURE shows a request tree.

DETAILED DESCRIPTION OF THE PREFERRED EMBODIMENTS

After implementing a program logic used for the open loop and closed loop control of an automation system, the program logic must first be translated into the machine language. In the context of a special translation step, a cross-reference list is generated. This cross-reference list contains all the identifiers included in the translated program logic. By combining the cross-reference lists generated in all the translation steps, a cross-reference list is obtained which includes all the identifiers used within the program logic and their locations of use. This cross-reference list is temporarily stored for subsequent analysis.

In a further step, all the module identifiers are selected from the cross-reference list. This produces a subquantity of the cross-reference list, which includes all the module identifiers and their locations of use.

From this partial list, it is now possible to select a specific module identifier, and hence a module, by means of a corresponding marking tool. Based on the information contained in the cross-reference list, i.e., the locations of use associated with this module identifier, a request tree is then calculated. The locations of use include the module request and the return address. The return address identifies the location of the program statement to be executed after execution of the module. It also identifies the requesting module. This information is then used to calculate the request tree.

For this purpose, the correspondingly selected cross-reference list is analyzed with respect to a selected module identifier. In a first step all the locations of use of the selected module identifier, i.e., all the modules requesting this selected module, are compiled. In a next step, in order to analyze the next deeper recursion level, the modules requesting this module are in turn included, and so forth, until all of the request paths have been included.

An algorithm to detect recursions is used to calculate the request tree. To this end, each request path contained in the request tree is checked to determine whether a return address occurs multiple times. If true, the calculation of the request path is aborted and the corresponding path is marked. The calculation of the request tree is then continued on the basis of the further locations of use. The program for calculating the request tree would otherwise get caught in an endless loop at this point.

Subsequently, the request path containing the recursion can then also be selected for observation. However, the recursion depth cannot be determined in detail because of the aforementioned program abort.

Notwithstanding this limitation, an overview in the form of the request tree depicted in the FIGURE is available at the end of the translation of the location of use of a selected module identifier.

The request tree depicted in the FIGURE includes nine numbered lines 1–9. In the exemplary embodiment it includes the module identifiers FB10, FB5, FB3, OB1. This is the request tree of the module identifier FB10. According to the display of the request tree, the module FB10 is requested by the modules FB5 and OB1 in the lines 2 and 9. The module FB5, in turn, is requested by the module FB3 in the lines 3 and 6. According to the lines 4, 5, 7 and 8, the module FB3 is requested by the module OB1. The request tree further contains information on the request location of the corresponding module. For example, according to line 2, the module FB10 is requested by the module FB5 through the fourth operation of a network NW10.

According to line 3, the module FB5, in turn, is requested through the sixth operation of the network NW4.

The request tree shown in the FIGURE is displayed to the user or startup engineer by means of a viewer. This viewer includes a marking tool for selecting individual lines and consequently a specific request path. By selecting individual lines, it is thus possible to define a specific request of a specific module.

The offset by columns of the individual lines 1–9 documents the different recursion levels.

If the user selects the line 5 in this exemplary embodiment, this selection defines the request of the module FB10, which is caused by the module FB5 in the network NW10 in the fourth operation, when this module FB5 is requested by the module FB3 in the network NW4 in the sixth operation and, in turn, this module FB3 is selected by the module OB1 in the network NW5 in the second operation.

The simple marking of an individual line in the request tree thus makes it possible to uniquely select even a highly nested request in a simple manner. A specific execution of the module FB10 is thereby marked. This unequivocal definition of a specific module request, in this case module FB10, is then transmitted to an observation tool, which displays this exact execution of the module FB10.

By selecting specific lines, it is also possible to select only portions of a request path. In the present example, by selecting the line 2, it is possible to define that the module FB10 should be observed only if it is requested by the module FB5 through the fourth operation in the network NW10.

However, the module FB10 is observed irrespective of whether the module FB5 is requested by the module FB3 in the network NW4 or NW6. Ultimately, therefore, selecting the line 2 marks a plurality of requests of the module FB10.

Such a selection would be meaningful if it were established that a specific module should be checked but uncertain which request should be observed.

Thus, the described testing method and testing device enable the startup engineer or programmer of an automation system to define specific requests of a selected module, and thereby to select them for further observation, with an ease of operation that has not previously been possible.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Testing method for commencing operation of a system that is controlled with a program logic, comprising:
   generating a cross-reference list with identifiers used within the program logic and respective locations of use of the identifiers,
   selecting module identifiers that are used to identify modules within the program logic and respective locations of use of the module identifiers, and
   generating an overview depiction of at least some requests of a selected one of the modules identified by the respective module identifier, for
   selecting at least one specific request of the selected module, and for
   observing execution of the at least one specific request of the selected module with an editor,
   wherein the overview depiction displays a view showing all modules that request the selected module and any modules that request said all modules that request the selected module, within said execution.

2. Testing method as claimed in claim 1, wherein the system is an automation system.

3. Testing method as claimed in claim 1, wherein the cross-reference list is a complete cross-reference list with all the identifiers used within the program logic and the respective locations of use of the identifiers.

4. Testing method as claimed in claim 1, wherein the program logic is implemented in a graphic programming language and is comprised at least largely of modules.

5. Testing method as claimed in claim 4, wherein the graphic programming language comprises ladder diagram or sequential function chart.

6. Testing method as claimed in claim 1, wherein the locations of use of the module identifiers generated in the cross-reference list respectively comprise the module request and a respective return address for the request.

7. Testing method as claimed in claim 6, further comprising:
   analyzing the return addresses related to the selected module, and displaying the overview depiction of the requests of the selected module in a hierarchical request tree with a viewer.

8. Testing method as claimed in claim 7, further comprising:
   aborting calculation of a request path of the selected module if the return address related to the selected module is listed multiple times.

9. Testing method as claimed in claim 7, wherein the viewer includes a marking tool that marks at least one line in the request tree and thereby uniquely defines at least one request of the selected module.

10. Testing method as claimed in claim 9, further comprising:
    displaying the request of the selected module that is uniquely defined by marking the at least one line in the request tree.

11. Testing device for starting up a system controlled with a program logic, comprising:
    a filter element selecting module identifiers, which identify modules of the program logic and respective locations of use of the identifiers, from a cross-reference list of all the identifiers used within the program logic and the locations of use of the identifiers within the program logic,
    a display device displaying the list of module identifiers to select one or more modules,
    a translation unit translating all requests of this module into a hierarchical display, and
    a viewer displaying the hierarchical display showing a selected module, all modules that request the selected module, and any modules that request said all modules that request the selected module.

12. Testing device as claimed in claim 11, wherein the system is an automation system.

13. Testing device as claimed in claim 11, wherein the viewer comprises a marking tool marking individual requests in the hierarchical display.

14. Testing device as claimed in claim 11, further comprising an editor observing execution of a module uniquely defined by selecting a specific request of the selected module.

15. A method, comprising:
    translating a program logic into machine language and generating a cross reference list containing identifiers within the translated program logic and locations for each of the identifiers;
    selecting module identifiers from the cross-reference list to produce a module identifier list containing module identifiers and locations for each of the module identifiers;
    selecting one module identifier from the module identifier list as a selected module; and
    generating and displaying a chart showing all modules that request the selected module,
    wherein the chart further shows any modules that request said all modules that request the selected module.

* * * * *